US00RE38554E1

(19) United States
(12) Reissued Patent
Ide

(10) Patent Number: US RE38,554 E
(45) Date of Reissued Patent: Jul. 13, 2004

(54) METHOD OF EXTENDING CAPABILITY OF MUSIC APPARATUS BY NETWORKING

(75) Inventor: Kensuke Ide, Hamamatsu (JP)

(73) Assignee: Yamaha Corporation, Hamamatsu (JP)

(21) Appl. No.: 09/828,247

(22) Filed: Apr. 6, 2001

Related U.S. Patent Documents

Reissue of:
(64) Patent No.: 5,892,171
Issued: Apr. 6, 1999
Appl. No.: 08/946,113
Filed: Oct. 7, 1997

(30) Foreign Application Priority Data

Oct. 18, 1996 (JP) ..... 8-276462
Aug. 22, 1997 (JP) ..... 9-226285

(51) Int. Cl.[7] ..... G10H 1/06; G10H 7/00
(52) U.S. Cl. ..... 84/622; 84/659
(58) Field of Search ..... 84/600, 622, 645, 84/659

(56) References Cited

U.S. PATENT DOCUMENTS 5,020,410 A * 6/1991 Sasaki ..... 84/602
5,300,725 A * 4/1994 Manabe ..... 84/609
5,532,923 A * 7/1996 Sone ..... 700/9
5,563,359 A * 10/1996 Okamura ..... 84/600
5,652,400 A * 7/1997 Fujimori et al. ..... 84/600
5,689,081 A * 11/1997 Tsurumi ..... 84/609
5,691,494 A * 11/1997 Sai et al. ..... 84/609
5,703,310 A * 12/1997 Kurakake et al. ..... 84/609
5,734,119 A * 3/1998 France et al. ..... 84/622

FOREIGN PATENT DOCUMENTS

EP 0372678 * 6/1990
JP 59-195692 * 11/1984
WO WO 92/08192 * 5/1992

* cited by examiner

*Primary Examiner*—Jeffrey Donels
(74) *Attorney, Agent, or Firm*—Morrison & Foerster LLP

(57) ABSTRACT

A network system is constructed for operating a music apparatus having a function as an electronic musical instrument under control by a local terminal which is communicable with a host computer through a network. In the system, the host computer is installed with a capability utilized to compute data effective to extent the function of the electronic musical instrument. The local terminal is connectable to the host computer through the network to remotely control the capability of the host computer so as to compute the data prepared for the music apparatus. The local terminal downloads the computed data from the host computer into the music apparatus through the local terminal. The music apparatus operates according to the downloaded data to extend its own function as the electronic musical instrument. Further, the capability itself can be transferred from the host computer to the music apparatus through the local terminal.

34 Claims, 9 Drawing Sheets

METHOD OF EXTENDING CAPABILITY OF MUSIC APPARATUS BY NETWORKING

Matter enclosed in heavy brackets [ ] appears in the original patent but forms no part of this reissue specification; matter printed in italics indicates the additions made by reissue.

BACKGROUND OF THE INVENTION

The present invention generally relates to a network system constructed by a host computer and local terminals. Specifically, the present invention relates to a method of extending a capability of a music apparatus equipped in the local terminal in the form of an electronic musical instrument or a personal computer having function of an electronic musical instrument.

In the field of electronic musical instruments, various capabilities have been conventionally realized, including a timbre synthesis capability for synthesizing timbres and an automatic accompaniment capability for performing automatic accompaniment by reproducing play data of an accompaniment pattern. Some of these capabilities are initially provided on electronic musical instruments, while others are not. It would be convenient if the capabilities not inherently provided in an electronic musical instrument can be subsequently added thereto. It is desired to provide a service for implementing such addition of the various capabilities. The same is true for a personal computer having function of an electronic musical instrument realized by an application software.

Most of the above-mentioned capabilities are conventionally implemented by microcomputer-based data processing. Electronic musical instruments themselves are also controlled by a microcomputer. This makes it possible to use, via a network, programs and other software resources that can implement various capabilities, thereby extending capabilities of the electronic musical instrument and personal computer having the electronic musical instrument function. p Meanwhile, use of the software resources reserved in a host computer by local terminals such as personal computers is conventionally practiced by connecting these local terminals to the host computer through a network. A procedure most frequently used in such a configuration is downloading of application programs from the host computer into the local terminals.

However, In the above-mentioned conventional procedure, the local terminal cannot execute a downloaded program if hardware resources of the local terminal is not enough for executing the downloaded program. Another problem with the conventional procedure is that local terminals of some types cannot install the application program due to incompatibility of their operating system or else. Still another problem is that, if the size of a program to be used is huge, a local terminal must download the program while consuming a considerable time without recognizing advantage and performance that the program will provide until the downloading is finished.

SUMMARY OF THE INVENTION

It is therefore an object of the present invention to achieve, by focusing on a network constituted by a host computer and local terminals, an extension of capabilities of a music apparatus such as an electronic musical instrument and a personal computer having function of an electronic musical instrument without any restriction from a local terminal to which the music apparatus is connected.

A first aspect of the invention is directed to a method of operating a music apparatus to function as an electronic musical instrument under control by a local terminal which is communicable with a host computer through a network. The inventive method comprises the steps of installing the host computer with a synthesizer capability utilized to computer timbre data, connecting the local terminal to the host computer through the network to remotely control the synthesizer capability of the host computer so as to compute the timbre data prepared for the music apparatus, downloading the computed timbre data from the host computer into the music apparatus through the local terminal so as to set a desired timbre of a musical tone, and operating the music apparatus to function as the electronic musical instrument to generate the musical tone having the desired timbre set by the downloaded timbre data.

According to the music apparatus capability extending method configured as mentioned above, the synthesizer capability or timbre synthesis capability is provided on the host computer of a network system. The timbre synthesis capability generates by computation timbre data to be handled by the music apparatus having the electronic musical instrument function. The local terminal networked to the host computer is connected to the music apparatus such as the electronic musical instrument and the personal computer having the electronic musical instrument function. From the local terminal, the timbre synthesis capability of the host computer is controlled remotely. A result of the timbre data computation by the host computer is sent to the music apparatus via the local terminal. Based on the received computation result, the music apparatus sets its own timbres of music tones. Therefore, even if the timbre synthesis capability is not provided on the music apparatus itself, timbres can be set in the form of data that can be handled by the music apparatus having the electronic musical instrument function.

A second aspect of the invention is directed to a method of operating a music apparatus to function as an electronic musical instrument according to song data representative of a desired song under control by a local terminal which is communicable with a host computer through a network. The method comprises the steps of installing the host computer with a sequencer capability utilized to time-sequentially process the song data to compute automatic play data, connecting the local terminal to the host computer through the network to remotely control the sequencer capability of the host computer while supplying thereto the song data so as to compute the automatic play data prepared for the music apparatus, downloading the computed automatic play data from the host computer into the music apparatus through the local terminal, and operating the music apparatus to function as the electronic musical instrument to undergo an automatic play of the desired song according to the downloaded automatic play data.

According to the music apparatus capability extending method configured as mentioned above, the sequencer capability or automatic accompaniment capability is provided on the host computer of a network system. The automatic accompaniment capability generates play data that can be handled by the music apparatus having the electronic musical instrument function. The local terminal networked to this host computer is connected to the music apparatus such as the electronic musical instrument and the personal computer having the electronic musical instrument function. The automatic accompaniment capability of the host computer is remotely controlled by the local terminal. In response to command information from the music apparatus, the host computer executes the automatic accompaniment capability. The play data generated by the automatic accompaniment capability of the host computer is sent to back the music apparatus via the local terminal. Based on the received play data, the music apparatus generates music tones to sound an automatic accompaniment. Therefore, even if the automatic accompaniment capability is not provided on the music apparatus itself, the automatic accompaniment can be performed by the play data that can be handled by the music apparatus having the electronic musical instrument function.

A third aspect of the invention is directed to a method of operating a music apparatus to function as an electronic musical instrument under control by a local terminal which is communicable with a host computer through a network. The inventive method comprises the steps of installing the host computer with an emulator capability utilized to emulate an operation of the electronic musical instrument, connecting the local terminal to the host computer through the network to remotely control the emulator capability of the host computer so as to compute operation data indicative of the operation of the electronic musical instrument upon emulation thereof, downloading the computed operation data from the host computer into the music apparatus through the local terminal, and virtually operating the music apparatus to function as the electronic musical instrument to investigate performance thereof according to the downloaded operation data without actually operating the music apparatus.

According to the music apparatus capability extending method configured as mentioned above, the emulator capability or electronic musical instrument simulating capability is provided on the host computer of a network system. The electronic musical instrument simulating capability simulates operation of an electronic musical instrument to generate by computation the operation data indicating the result of the simulation. The local terminal networked to this host computer is connected to the music apparatus such as an electronic musical instrument and a personal computer having an electronic musical instrument function. The electronic musical instrument simulating capability of the host computer is remotely controlled by the local terminal. The operation data obtained based on the result of the computation by the electronic musical instrument simulating capability of the host computer is sent to the music apparatus via the local terminal. On the music apparatus, the operation according to this operation data is performed. This electronic musical instrument simulating capability performs simulation on the network with respect to how the music apparatus such as the electronic musical instrument and the personal computer having the electronic musical instrument function operates according to particular settings. This allows the user to make familiar with or learn the specifications, capabilities, and handling of a particular music apparatus such as the electronic musical instrument and the personal computer having the electronic musical instrument function.

A fourth aspect of the invention is directed to a method of extending a desired capability of a music apparatus having function of an electronic musical instrument under control by a local terminal which is communicable with a host computer through a network. The method comprises the steps of installing the host computer with a program composed of a function module which is executable to provide the desired capability and a first interface module which interfaces the function module with the local terminal through the network when the local terminal remotely executes the function module installed in the host computer, preparing in the host computer a second interface module which is specifically designed to adapt the function module to the music apparatus, connecting the local terminal to the host computer through the network to download a set of the function module and the second interface module into the music apparatus by means of the local terminal, and allowing the music apparatus to internally execute the downloaded function module through the downloaded second interface module to thereby extend the desired capability as the electronic musical instrument.

According to the music apparatus capability extending method configured as mentioned above, the application program and the second interface module prepared for the music apparatus are provided on the host computer of a network system. This program is composed of the function module executable for providing the desired capability associated with the music apparatus and the first interface module generally designed for interfacing this function module with the network. The second interface module prepared for the music apparatus corresponds to the function module of the application program. The local terminal networked to the host computer is connected to the music apparatus such as an electronic musical instrument and a personal computer having an electronic musical instrument function. Then, the function module of the application program stored in the host computer and the second interface module for the music apparatus stored also in the host computer are sent to the music apparatus via the local terminal. This allows installation of a new capability associated with the music apparatus by the function module via the second interface module for the music apparatus as well as upgrading of the existing capabilities.

A fifth aspect of the invention is directed to a music apparatus attachable to a local terminal which is communicable with a host computer through a network for extending a desired capability of the music apparatus having function of an electronic musical instrument, the host computer being installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus. The inventive music apparatus comprises means for commanding the terminal apparatus to communicate with the host computer through the network to download a set of the function module and the second interface module from the host computer, means for storing the set of the function module and the second interface module downloaded by the local terminal, and means for internally executing the stored function module through the stored second interface module to thereby extend the desired capability as the electronic musical instrument.

The music apparatus configured as mentioned above is connected to one local terminal of a network system composed of a host computer and local terminals. This music apparatus stores the function module initially provided in the host computer and the second interface module prepared for the music apparatus as a set into an internal storage. This allows installation of a new capability associated with the electronic musical instrument function of the music apparatus by the function module via the second interface module for the music apparatus as well as upgrading of the existing capabilities.

In the above-mentioned inventive methods of extending music apparatus capabilities according to the first, second and third aspects, each capability to be executed on the music apparatus only needs to be remotely controlled by the local terminal, leaving actual data computation to the host computer. Therefore, desired capabilities are available to the user without restriction imposed by the scale of the user local terminal. In using the music apparatus associated with the fourth and fifth aspects of the present invention, the function module of the application program and the second interface module prepared for the music apparatus are downloaded as a set to the music apparatus, thereby allowing implementation of desired capabilities regardless of the setting of the local terminal and the characteristics of the operating system used in the local terminal.

The invention further covers various machine readable media. A first machine readable medium is for use in a local terminal which has a CPU and which is communicable with a host computer through a network, the host computer being installed with a synthesizer capability utilized to compute timbre data. The first medium contains program instructions executable by the CPU for causing the local terminal to operate a music apparatus equipped therein to function as an electronic musical instrument by the steps of connecting the local terminal to the host computer through the network to remotely control the synthesizer capability of the host computer so as to compute the timbre data prepared for the music apparatus, downloading the computed timbre data from the host computer into the music apparatus through the local terminal so as to set a desired timbre of a musical tone, and operating the music apparatus to function as the electronic musical instrument to generate the musical tone having the desired timbre set by the downloaded timbre data.

A second machine readable medium is for use in a local terminal which has a CPU and which is communicable with a host computer through a network, the host computer being installed with a sequencer capability utilized to time-sequentially process song data representative of a desired song to compute automatic play data. The second medium contains program instructions executable by the CPU for causing the local terminal to operate a music apparatus equipped therein to function as an electronic musical instrument by the steps of connecting the local terminal to the host computer through the network to remotely control the sequencer capability of the host computer while supplying thereto the song data so as to compute the automatic play data prepared for the music apparatus, downloading the computed automatic play data from the host computer into the music apparatus through the local terminal, and operating the music apparatus to function as the electronic musical instrument to undergo an automatic play of the desired song according to the downloaded automatic play data.

A third machine readable medium is for use in a local terminal which has a CPU and which is communicable with a host computer through a network, the host computer being installed with an emulator capability utilized to emulate an operation of an electronic musical instrument. The third medium contains program instructions executable by the CPU for causing the local terminal to operate a music apparatus equipped therein to function as the electronic musical instrument by the steps of connecting the local terminal to the host computer through the network to remotely control the emulator capability of the host computer so as to compute operation data indicative of the operation of the electronic musical instrument upon emulation thereof, downloading the computed operation data from the host computer into the music apparatus through the local terminal, and virtually operating the music apparatus to function as the electronic musical instrument to investigate performance thereof according to the downloaded operation data without actually operating the music apparatus.

A fourth machine readable medium is for use in a local terminal which has a CPU and which is communicable with a host computer through a network for extending a desired capability of a music apparatus which is equipped in the local terminal and which has a function of an electronic musical instrument, the host computer being installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus. The fourth medium contains instructions processed by the CPU for causing the local terminal to operate the music apparatus by the steps of communicating with the host computer through the network to download a set of the function module and the second interface module from the host computer, storing the set of the function module and the second interface module downloaded by the local terminal into a storage provided in the music apparatus, and allowing the music apparatus to internally execute the stored function module through the stored second interface module to thereby extend the desired capability as the electronic musical instrument.

A fifth machine readable medium is for use in a music apparatus which has a CPU and which is attachable to a local terminal communicable with a host computer through a network for extending a desired capability of the music apparatus having a function of an electronic musical instrument, the host computer being installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus. The fifth medium contains instructions processed by the CPU for causing the music apparatus to perform the steps of commanding the terminal apparatus to communicate with the host computer through the network to download a set of the function module and the second interface module from the host computer, storing the set of the function module and the second interface module downloaded by the local terminal, and internally executing the stored function module through the stored second interface module to thereby extend the desired capability as the electronic musical instrument.

DETAILED DESCRIPTION OF THE INVENTION

Figure 1:
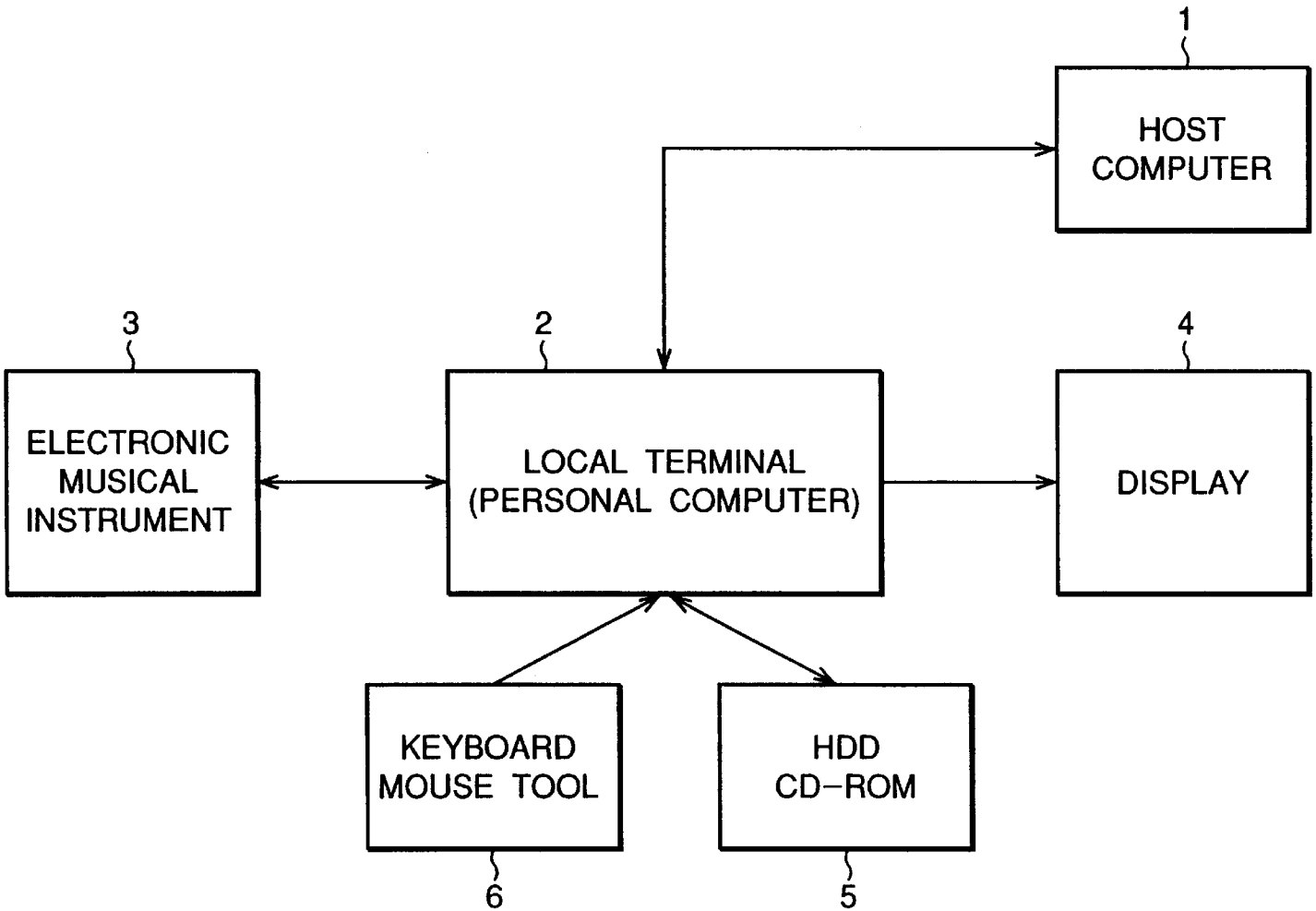
FIG. 1 is a block diagram illustrating a network system to which the present invention is applied.

This invention will be described in further detail by way of example with reference to the accompanying drawings. FIG. 1 is a block diagram illustrating a network system to which the present invention is applied. A host computer 1 is connected to a local terminal 2 such a personal computer or the like having a central processing unit (CPU). The local terminal 2 is connected to those of a music apparatus in the form of an electronic musical instrument 3, a display 4, an external storage device 5 such as an HDD (Hard Disk Drive) or a CD-ROM drive, and an input device 6 such as a keyboard or a mouse tool. It should be noted that the electronic musical instrument 3 and the local terminal 2 are interconnected by MIDI (Musical Instrument Digital Interface) or other communication protocols. Data is communicated between the host computer 1 and the local terminal 2, and between the local terminal 2 and the electronic musical instrument 3. Alternatively, the music apparatus may be composed of a personal computer having a function of an electronic musical instrument implemented by an application software in place of the electronic musical instrument 3.

Figure 8:
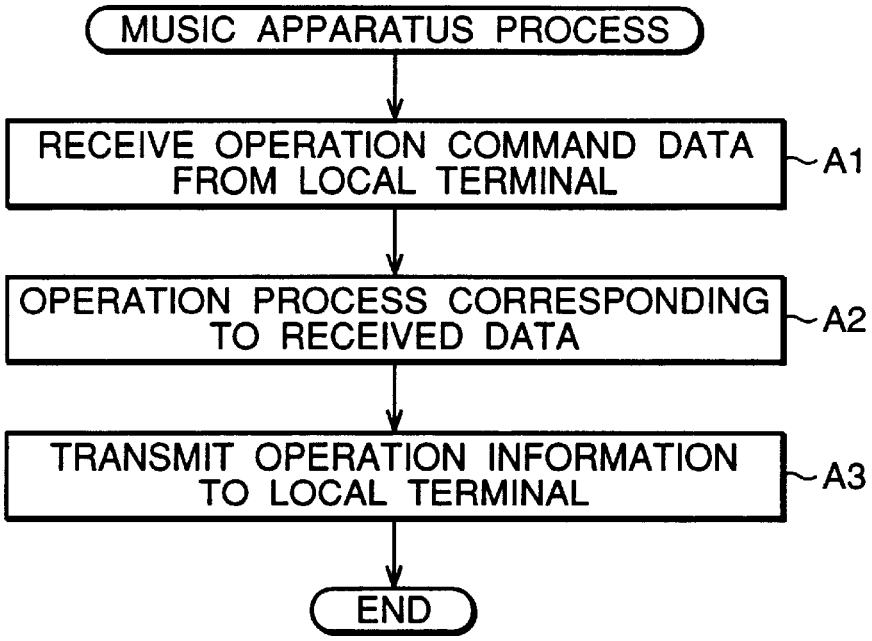
FIG. 8 is a flowchart of a program concerning data communication process in the music apparatus.
Figure 10:
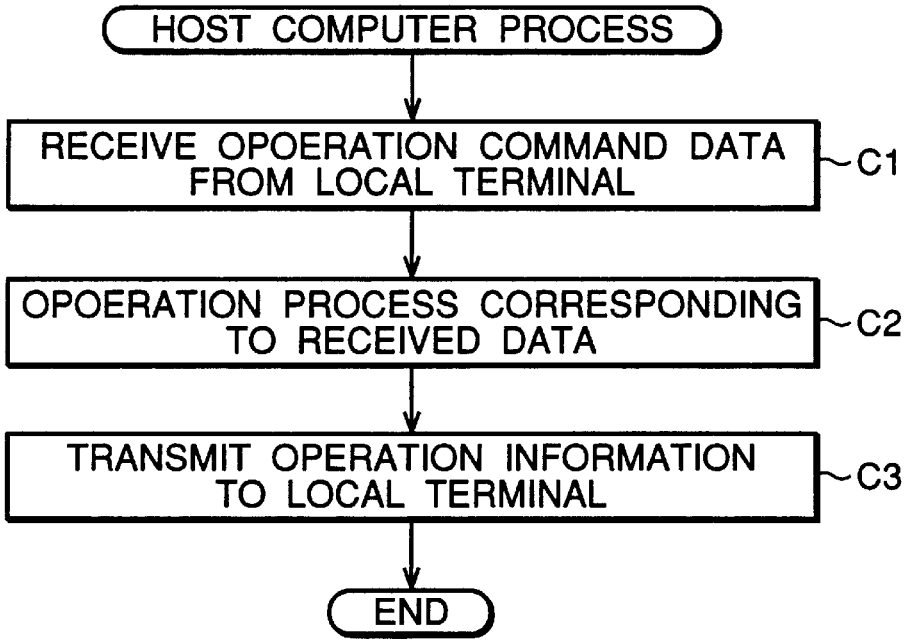
FIG. 10 is a flowchart of a program concerning data communication process in the host computer.
Figure 9A:
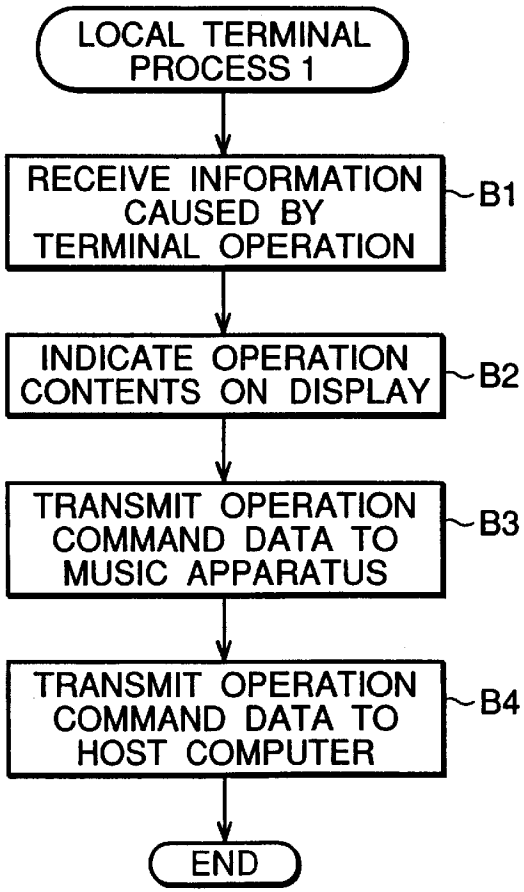
FIGS. 9A, 9B and 9C are a flowchart of a program concerning data communication process in the local terminal.
Figure 9B:
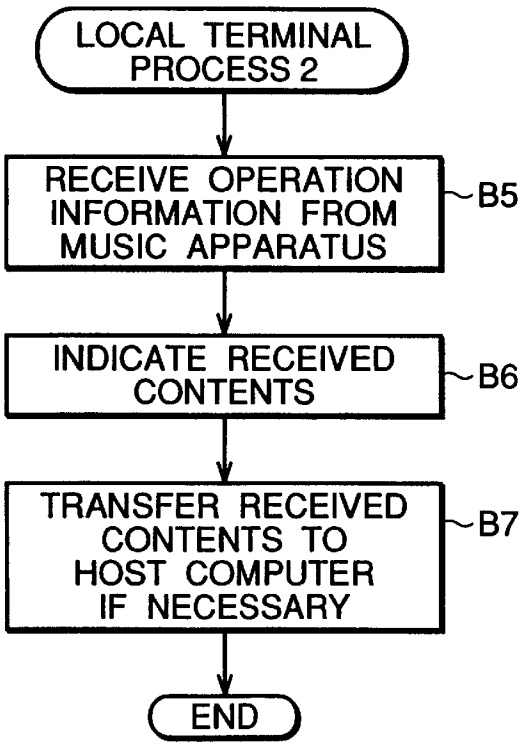
Figure 9C:
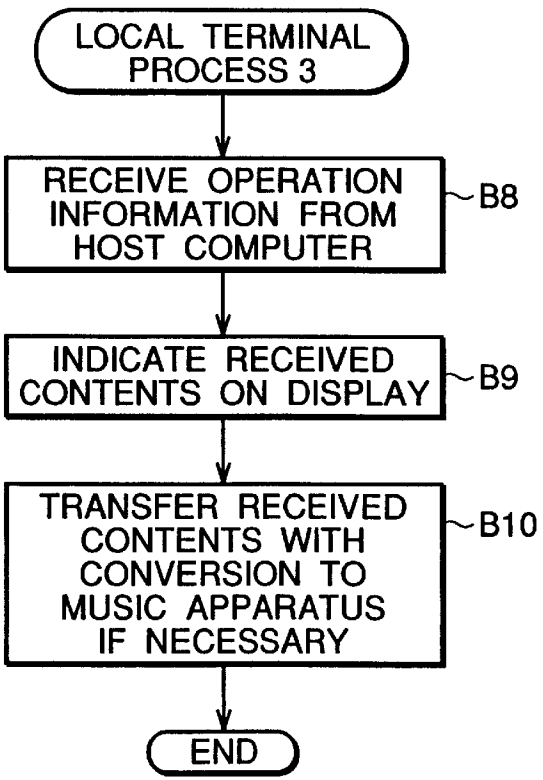

FIG. 8 is a flowchart of a program concerning data communication process of the music apparatus such as the electronic musical instrument 3 or the personal computer. FIGS. 9A, 9B and 9C are a flowchart of a program concerning data communication process of the local terminal 2. FIG. 10 is a flowchart of a program concerning data communication process of the host computer 1.

As shown in FIG. 8, the music apparatus receives operation command data from the local terminal 2 in step A1, carries out operation process corresponding to the received data in step A2, and transmits operation information to the local terminal 2 in step A3, thereby finishing one communication cycle.

As shown in FIG. 9A, the local terminal 2 receives information inputted by operation of the input device 6 in step B1, and displays contents of the operation on the display 4 in step B2. If there is operation command data for the music apparatus, the local terminal 2 transmits the operation command data to the music apparatus in step B3. If there is operation command data for the host computer 1, the local terminal 2 transmits the operation command data to the host computer 1 in step B4, thereby completing one communication cycle according to a first transmission mode.

As shown in FIG. 9B, the local terminal 2 receives operation information from the music apparatus 3 in step B5, and displays the received contents on the display 4 in step B6. In step B7, the local terminal 2 transmits the received contents if necessary to the host computer 1 while converting the received contents into a command acceptable by the host computer 1, thereby finishing one communication cycle under a second transmission mode.

Further, as shown in FIG. 9C, the local terminal 2 receives operation information from the host computer 1 in step B8, and displays the received contents on the display 4 in step B9. In step B10, the local terminal 2 transfers the received contents to the music apparatus 3 if necessary while converting the received contents into a command acceptable by the music apparatus, thereby ending one communication cycle under a third transmission mode.

Further, as shown in FIG. 10, the host computer 1 receives operation command data from the local terminal 2 in step C1, carries out operation process corresponding to the received data in step C2, and transmits operation information to the local terminal 2 in step C3, thereby finishing one communication cycle.

As described above, the music apparatus, the local terminal 2 and the personal computer 1 constitute together a system to conduct the data communication to perform extension of the capability of the music apparatus. Namely, the inventive system is constructed for operating the music apparatus having a function as the electronic musical instrument 3 under control by the local terminal 2 which is communicable with the host computer 1 through a network. In the system, the host computer 1 is installed with a capability utilized to compute data effective to extend the function of the electronic musical instrument 3. The local terminal 2 is connectable to the host computer 1 through the network to remotely control the capability of the host computer 1 so as to compute the data prepared for the music apparatus. The local terminal 2 downloads the computed data from the host computer 1 into the music apparatus through the local terminal 2. The music apparatus operates according to the downloaded data to extend its own function as the electronic musical instrument 3.

Figure 2:
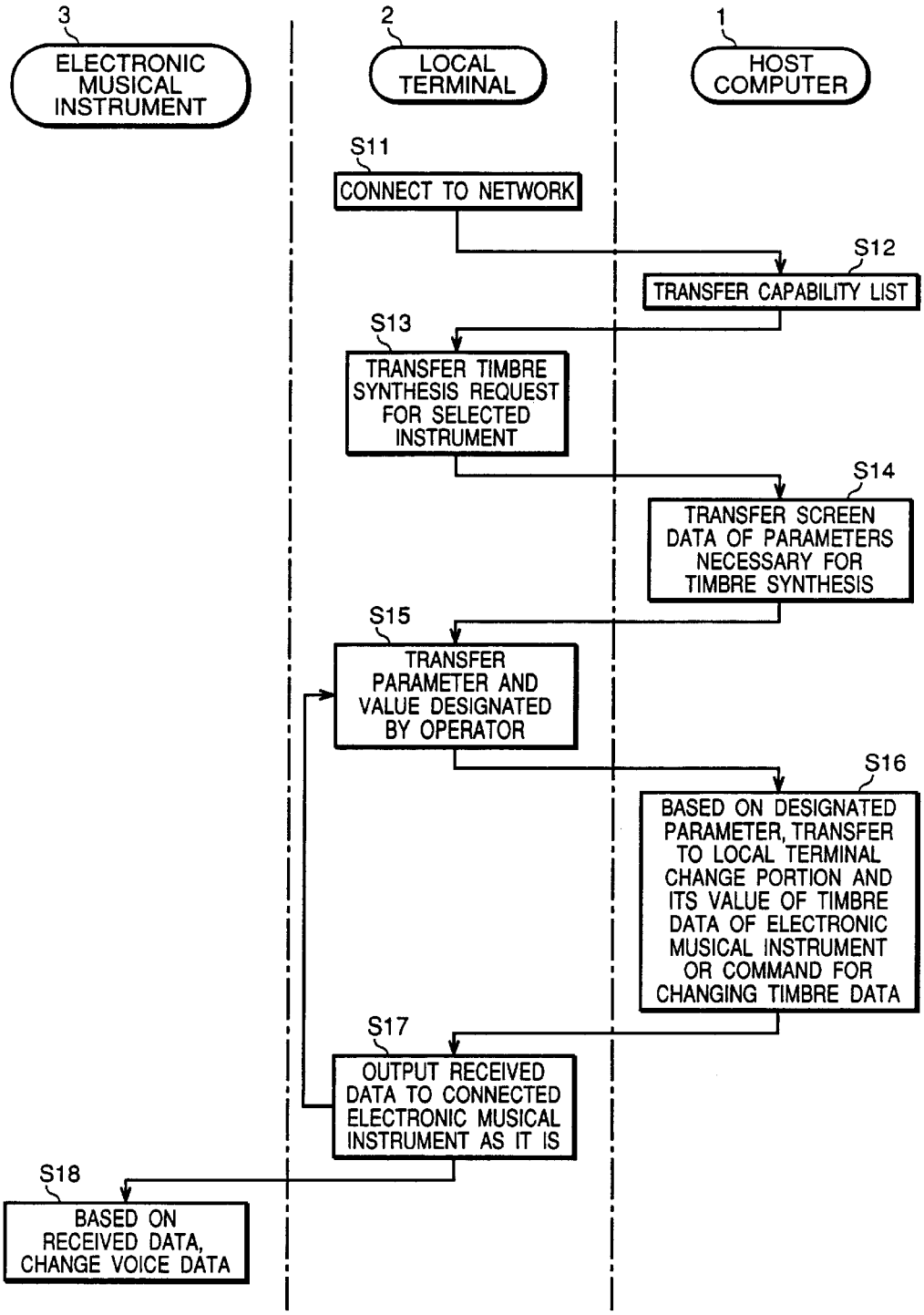
FIG. 2 is a diagram illustrating a procedure of data communication when using a timbre synthesis capability of a host computer in the first embodiment of the invention.

The following are examples of various capabilities. In these examples, the electronic musical instrument 3 is connected as the music apparatus to the local terminal 2. FIG. 2 is a diagram illustrating the first embodiment of the invention, a procedure of data communication for using a timbre synthesis capability of the host computer 1. First, the local terminal 2 is connected to the network to access the host computer 1 (S11). The host computer 1 transfers to the local terminal 2 data for displaying a list of capabilities available in the host computer 1 (S12). Receiving this data, the local terminal 2 displays the list on the display 4, and waits for input operation by the user or operator. The operator enters selection of a capability from the input device 6. When the timbre synthesis capability is selected, the local terminal 2 sends a timbre synthesis request to the host computer 1. (S13).

Receiving the timbre synthesis request or command, the host computer 1 sends data used for displaying a parameter setting screen to the local terminal 2 to request for parameters necessary for timbre synthesis(S14). The parameter setting screen may look like a display screen created by a timbre synthesizer application software designed for personal computers. The local terminal 2 displays the parameter setting screen on the display 4, and waits for input of operation by the operator. When a parameter is selected by the operator on the display screen, the local terminal 2 sends the type and value of the selected parameter to the host computer 1 (S15).

Based on the received parameter, the host computer 1 sends to the local terminal 2 a change item and its value of the timbre data of the electronic musical instrument or a command for changing the timbre data itself (S16). The local terminal 2 outputs the data from the host computer 1 to the electronic musical instrument 3 as it is (S17). Based on the data received from the local terminal 2, the electronic musical instrument 3 changes timbre or voice(S18). By repeating the above-mentioned parameter transfer from the local terminal 2 to the host computer 1, data transfer from the host computer 1 to the local terminal 2, and data transfer from the local terminal 2 to the electronic musical instrument 3, the local terminal 2 can remotely control the timbre synthesis capability or synthesizer capability on the host computer 1, thereby providing generated timbre data as voice data to the electronic musical instrument 3.

Namely, the first embodiment of the invention shown in FIG. 2 is directed to a method of operating a music apparatus to function as the electronic musical instrument 3 under control by the local terminal 2 which is communicable with the host computer 1 through a network. The inventive method comprises the steps of provisionally installing the host computer 1 with a synthesizer capability utilized to compute timbre data, connecting the local terminal 2 to the host computer 1 through the network to remotely control the synthesizer capability of the host computer 1 so as to compute the timbre data prepared for the music apparatus, downloading the computed timbre data from the host computer 1 into the music apparatus through the local terminal 2 so as to set a desired timbre of a musical tone, and operating the music apparatus to function as the electronic musical instrument 3 to generate the musical tone having the desired timbre set by the downloaded timbre data.

Figure 3:
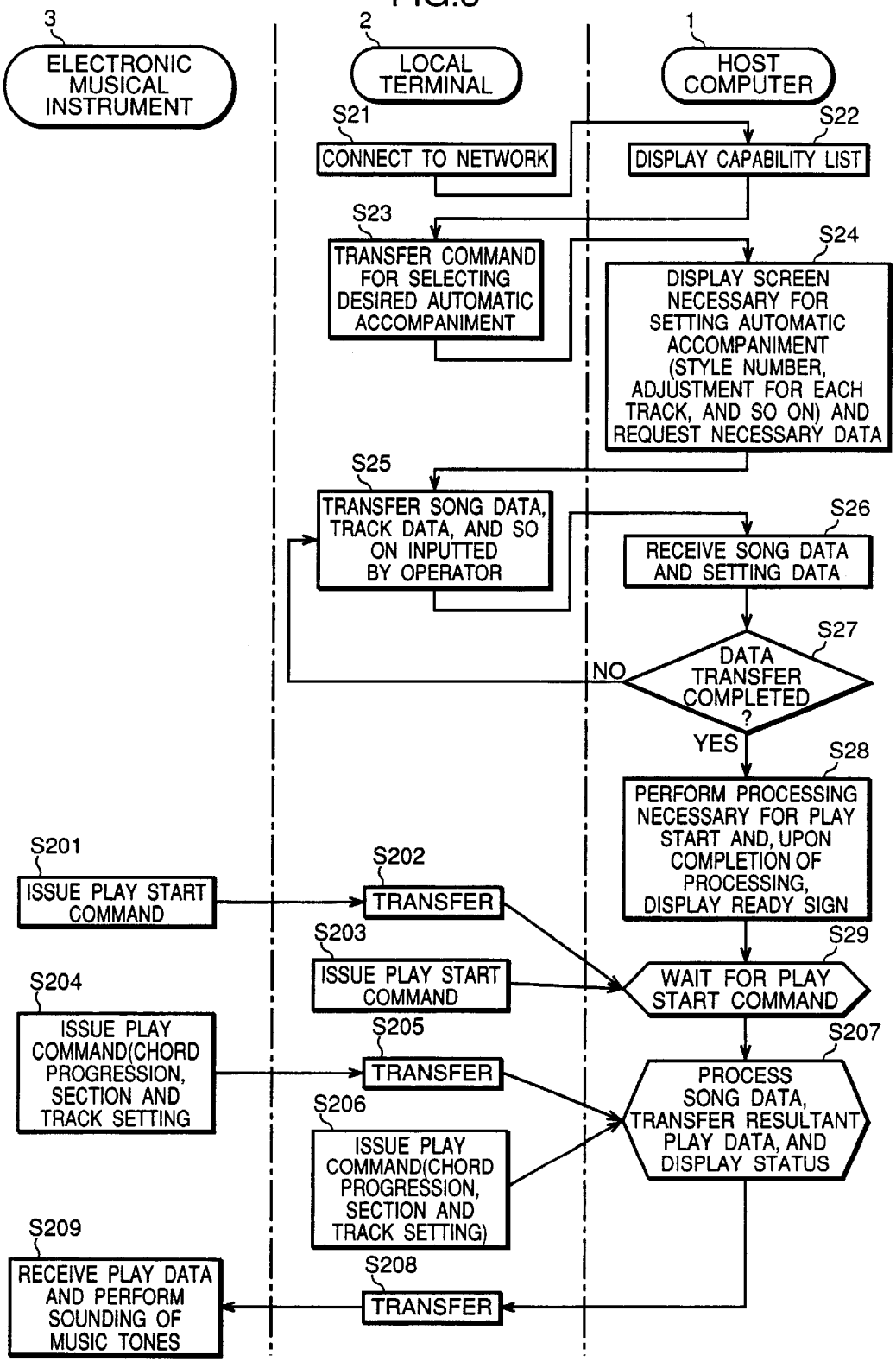
FIG. 3 is a diagram illustrating a procedure of data communication when using an automatic accompaniment capability of a host computer in the second embodiment of the invention.

FIG. 3 is a diagram illustrating the second embodiment of the invention, a procedure of data communication when the automatic accompaniment capability is used. First, the local terminal 2 is connected to a network to access the host computer 1 (S21). The host computer 1 transfers data for displaying a list of capabilities installed in the host computer itself to the local terminal 2 (S22). The local terminal 2 displays the capability list on a display 4, and waits for input of selection by the operator. When the operator selects the automatic accompaniment capability, the local terminal 2 transfers an automatic accompaniment request to the host computer 1 (S23).

Receiving the automatic accompaniment request, the host computer 1 sends to the local terminal 2 screen setting data used for displaying a setting screen necessary for setting automatic play such as automatic accompaniment (semi-automatic play) or automatic performance (ful-automatic play), as well as a request necessary for setting condition of the automatic accompaniment or automatic performance (S24). The setting screen may look like a display screen of a sequencer (on which style number setting, adjustment of each track, and so on are performed). The local terminal 2 displays the setting screen on the display 4, and waits for input of setting by the operator. When data is entered by the operator on this setting screen, the local terminal 2 sends the inputted data including song data, track data, and so on to the host computer 1 (S25).

The host computer 1 receives the setting data such as song data and track data from the local terminal 2 (S26). The host computer 1 determines whether the transfer of the data has been completed (S27). If the transfer has not been completed, the host computer 1 receives the remaining data from the local terminal 2. When the transfer has been completed, the host computer 1 performs processing necessary for starting the automatic play. When this processing has been completed, the host computer 1 makes the local terminal 2 display a ready signal (S28). At this moment, the automatic play such as automatic accompaniment is ready to start, and the local terminal 2 waits for starting of manual play by the operator on the electronic musical instrument 3 (S29).

When the operator starts playing on the electronic musical instrument 3, the electronic musical instrument 3 issues a play start command to the local terminal 2 (S201). The local terminal 2 transfers this play start command to the host computer 1 (S202). It should be noted that the local terminal 2 may also issue a play start command to the host computer 1 in place of the electronic musical instrument 3(S203). Receiving the play start command, the host computer 1 starts processing of the song data to time-sequentially issue automatic play data. Meanwhile, the electronic musical instrument 3 outputs a play command indicating chord progression, a section indicative of instrument type, and track setting to the local terminal 2 (S204). The local terminal 2 transfers this play command to the host computer 1 (S205). When a play command is directly inputted in the local terminal 2, the inputted play command is also transferred to the host computer 1 (S206). Based on the above-mentioned play commands, the host computer 1 time-sequentially processes the song data as a regular sequencer would do, and transfers automatic play data to the local terminal 2. At the same time, the host computer 1 transfers status information such as music progression state to the local terminal 2 (S207). The local terminal 2 transfers the play data transmitted from the host computer 1 to the electronic musical instrument 3 (S208). Receiving the play data, the electronic musical instrument 3 performs sounding process of the automatic play (S209). Thus, even if the electronic musical instrument 3 has no automatic accompaniment capability or sequencer capability, automatic accompaniment can be performed by the pre-installed application program of the host computer 1.

Figure 4:
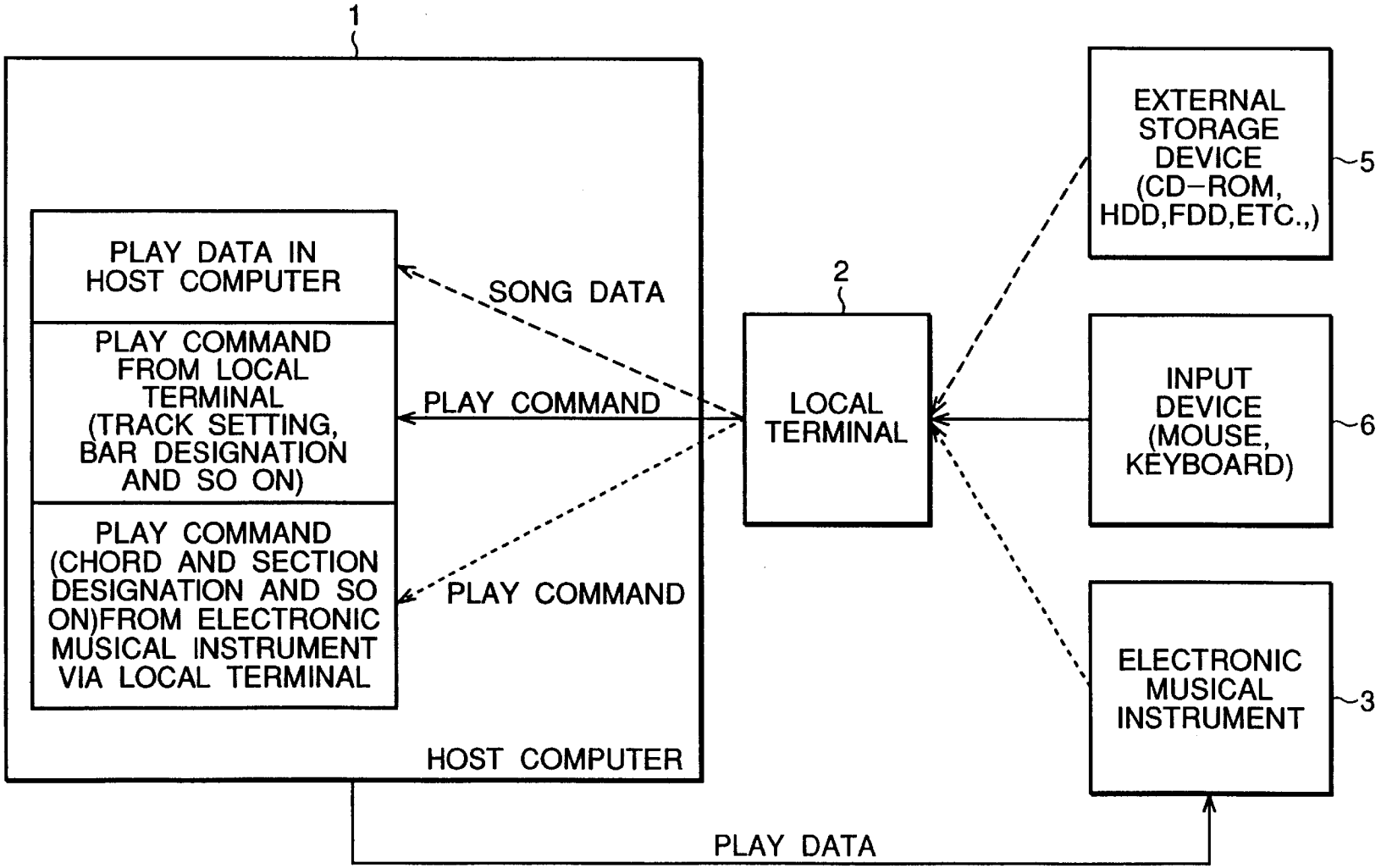
FIG. 4 is a diagram illustrating a data flow during automatic accompaniment in the second embodiment.

FIG. 4 is a diagram indicating the data flow during the above-mentioned automatic accompaniment. First, the external storage device 5 stores song data which is a meta-file or source file of play data. As indicated with a dashed-line, this song data is supplied to the host computer 1 via the local terminal 2 to be stored as the source file in the host computer 1. It should be noted that, in this automatic accompaniment, if the song data is read section by section from the local terminal 2 for storage, a next section is sequentially read from the local terminal 2 for storage without interrupting the progression of the performance before the preceding section runs out.

As indicated with a solid-line, data from the input device 6 is inputted into the local terminal 2. The local terminal 2 extracts play command data such as track setting and bar designation data from this input data and transfers the same to the host computer 1 for storage therein. As indicated with a dotted-line, play command data such as data for designating chord and part from the electronic musical instrument 3 is transferred to the host computer 1 via the local terminal 2 for storage in the host computer 1. Further, as indicated with another solid-line, play data reproduced by the automatic accompaniment capability of the host computer 1 is transferred to the electronic musical instrument 3. It should be noted that, since in automatic accompaniment the play data is reproduced based on the chord progression transmitted from the electronic musical instrument 3, play command data indicated with the dashed-line from the electronic musical instrument 3 is required. For simple automatic performance, this play command data is not required.

The second embodiment shown in FIGS. 3 and 4 is directed to a method of operating a music apparatus to function as an electronic musical instrument 3 according to song data representative of a desired song under control by the local terminal 2 which is communicable with the host computer 1 through a network. The method comprises the steps of installing the host computer 1 with a sequencer capability utilized to time-sequentially process the song data to compute automatic play data, connecting the local terminal 2 to the host computer 1 through the network to remotely control the sequencer capability of the host computer 1 while supplying thereto the song data so as to compute the automatic play data prepared for the music apparatus, downloading the computed automatic play data from the host computer 1 into the music apparatus through the local terminal 2, and operating the music apparatus to function as the electronic musical instrument 3 to undergo an automatic play of the desired song according to the downloaded automatic play data.

Figure 5:
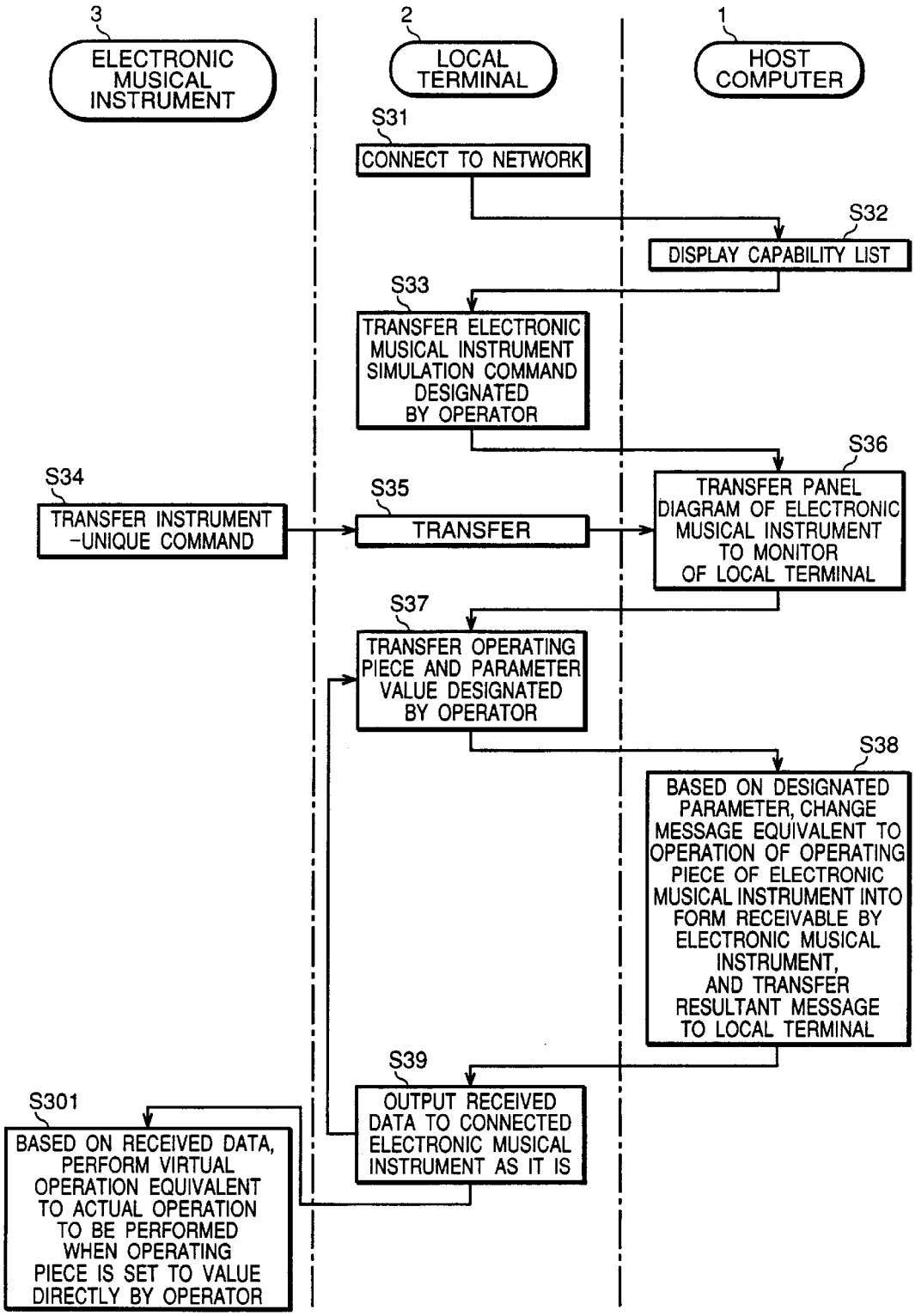
FIG. 5 is a diagram illustrating a procedure of data communication when using an electronic musical instrument simulating capability of a host computer in the third embodiment of the invention.

FIG. 5 is a diagram illustrating the third embodiment of the invention, a procedure of data communication for using the electronic musical instrument simulating capability. First, the local terminal 2 is connected to a network to access the host computer 1 (S31). Data about a list of capabilities to be provided by the host computer 1 is transferred therefrom to the local terminal 2 (S32). The local terminal 2 displays the capability list on the display 4 and waits for input of selection by the operator. When the operator selects the electronic musical instrument simulating capability or emulator capability, the local terminal 2 transfers an electronic musical instrument simulation command to the host computer 1 (S33). The electronic musical instrument 3 outputs an instrument-unique command indicating the type and so on of this instrument to the local terminal 2 (S34). The local terminal 2 transfers this instrument-unique command to the host computer 1 (S35).

Receiving the electronic musical instrument simulation command and the instrument-unique command, the host computer 1 transfers screen data for displaying a panel diagram of the electronic musical instrument 3 to the local terminal 2 (S36). Based on the received screen data, the local terminal 2 displays the panel diagram of the electronic musical instrument 3 on the display 4, and waits for input of setting by the operator. When an operating piece of the musical instrument and a parameter value are designated by the operator on this panel diagram, the local terminal 2 transfers data indicating the type of the operating piece and the parameter value to the host computer 1 (S37).

Based on the received parameter value, the host computer 1 simulates operation of the designated operating piece of the electronic musical instrument 3 up to that parameter value, and generates a message equivalent to the simulated operation. The host computer changes this message into a form receivable by the electronic musical instrument 3, and transfers the result to the local terminal 2 (S38). The local terminal 2 outputs the data coming from the host computer 1 to the electronic musical instrument 3 as it is (S39). Based on this data coming from the local terminal 2, the electronic musical instrument 3 operates virtually(S301). This allows the electronic musical instrument 3 to virtually perform an operation equivalent to that to be performed when an actual operating piece is set to the parameter value designated by the local terminal 2. By repeating the transfer of the operating piece type data and the parameter value from the local terminal 2 to the host computer 1, the data transfer from the host computer 1 to the local terminal 2, and the data transfer from the local terminal 2 to the electronic musical instrument 3, the local terminal 2 can control the electronic musical instrument simulating capability of the host computer 1. By simulating or emulating the operation of the electronic musical instrument 3, the user becomes familiar with the specifications, capabilities, and handling of the electronic musical instrument 3.

The third embodiment of the invention shown in FIG. 5 is directed to a method of operating a music apparatus to function as an electronic musical instrument under control by the local terminal 2 which is communicable with the host computer 1 through a network. The inventive method comprises the steps of pre-installing the host computer 1 with an emulator capability utilized to emulate an operation of the electronic musical instrument 3, connecting the local terminal 2 to the host computer 1 through the network to remotely control the emulator capability of the host computer 1 so as to compute operation data indicative of the operation of the electronic musical instrument 3 upon emulation thereof, downloading the computed operation data from the host computer 1 into the music apparatus through the local terminal 2, and virtually operating the music apparatus to function as the electronic musical instrument 3 to investigate and learn performance thereof according to the downloaded operation data without actually operating the music apparatus.

In an advanced form of the invention, the various capabilities installed in the host computer can be selectively transferred to the music apparatus through the local terminal. Namely, The inventive system shown in FIG. 1 is constructed for extending a desired capability of a music apparatus having a function of the electronic musical instrument 3 under control by the local terminal 2 which is communicable with the host computer 1 through a network. In the inventive system, the host computer 1 is installed with a program composed of a function module which is executable to provide the desired capability and a first interface module which interfaces the function module with the local terminal 2 through the network when the local terminal 2 remotely executes the function module installed in the host computer 1. The host computer 1 is further installed with a second interface module which is specifically prepared to adapt the function module to the music apparatus. The local terminal 2 is connected to the host computer 1 through the network to download a set of the function module and the second interface module from the host computer. The music apparatus is equipped in the local terminal 2 and has a storage for storing the set of the function module and the second interface module downloaded by the local terminal 1. The music apparatus internally executes the stored function module through the stored second interface module to thereby extend the desired capability as the electronic musical instrument 3.

Figure 6:
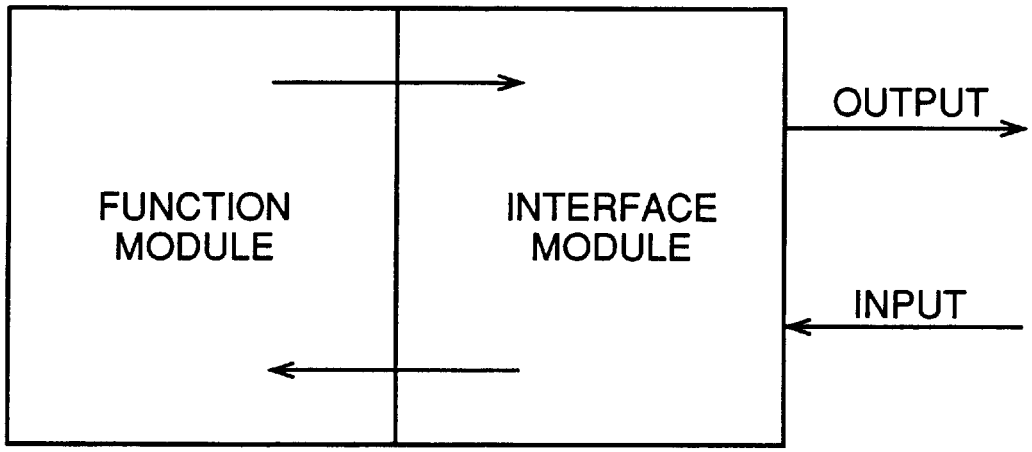
FIG. 6 is a diagram illustrating a program structure installed in a host computer.

In detail, as shown in FIG. 6, each application program installed in the host computer 1 for implementing the timbre synthesis capability, the automatic accompaniment capability, and the electronic musical instrument simulating capability is divided into the function module for implementing these capabilities and the first interface module for mainly interfacing the function module with the outside or the network. Further, the second interface module for an electronic musical instrument (interface for a music apparatus), other than the first interface module of the functional program, is provided in the host computer 1 in correspondence with the function module along with each application program. The second interface module for the electronic musical instrument and the corresponding function module can be downloaded into a RAM of the electronic musical instrument 3 as a set via the local terminal 2 to introduced desired one of the capabilities into the electronic musical instrument 3.

Figure 7:
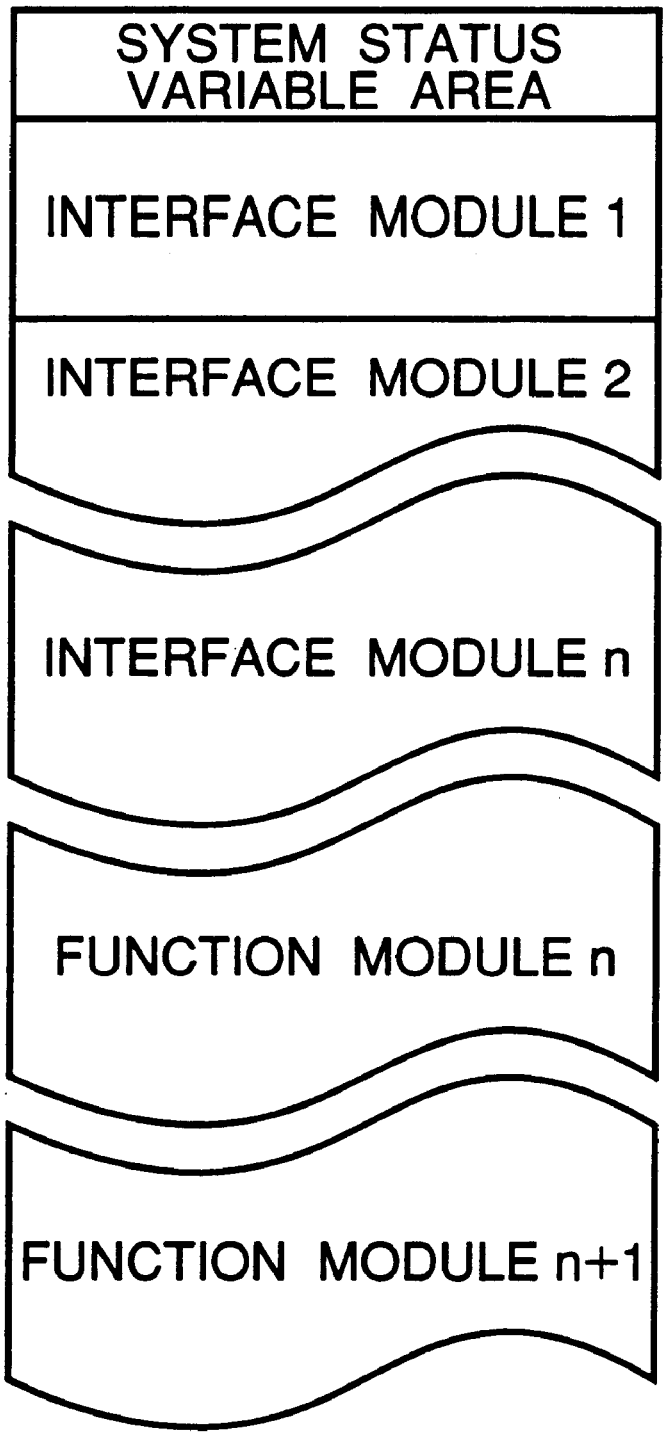
FIG. 7 is a diagram illustrating a program structure downloaded in a music apparatus equipped in a local terminal.

Namely, as shown in FIG. 7, the electronic musical instrument 3 stores in the RAM thereof a plurality of second interface modules specifically prepared for the electronic musical instrument 3 and a plurality of corresponding function modules. Each interface module controls the corresponding function module to implement the capability. It should be noted that, since each function module is provided for each capability, two or more interface modules and function modules may operate simultaneously in the electronic musical instrument 3. In view of this, a system status variable area is provided as shown in FIG. 7, the area having a structure allowing reference to important system values such that the states of the modules can be recognized as a whole. Each interface module is adapted to reference this system status variable area, and coexists while rewriting this area without causing contraction between the modules. It will be apparent that this control over the entire system may not be performed by each interface module; rather, the electronic musical instrument 3 may be constituted to control the entire system and to allocate jobs to the interface modules and the function modules according to the status thereof.

Namely, the advanced form of the invention is directed to a method of extending a desired capability of a music apparatus having a function of the electronic musical instrument 3 under control by the local terminal 2 which is communicable with the host computer 1 through a network. The method comprises the steps of installing the host computer 3 with a program composed of a function module which is executable to provide the desired capability and a first interface module which interfaces the function module with the local terminal 2 through the network when the local terminal 2 remotely executes the function module installed in the host computer 1, preparing in the host computer 1 a second interface module which is specifically designed to adapt the function module to the music apparatus, connecting the local terminal 2 to the host computer 1 through the network to download a set of the function module and the second interface module into the music apparatus by means of the local terminal 2, and allowing the music apparatus to internally execute the downloaded function module through the downloaded second interface module to thereby extend the desired capability as the electronic musical instrument 3.

Further, the invention is directed to a music apparatus attachable to the local terminal 2 which is communicable with the host computer 1 through a network for extending a desired capability of the music apparatus having function of the electronic musical instrument 3. The host computer 1 is installed with a program composed of a function module which is executable to provide the desired capability and a first interface module which interfaces the function module with the local terminal 2 through the network when the local terminal 2 remotely executes the function module installed in the host computer 1. The host computer 1 is further installed with a second interface module which is specifically prepared to adapt the function module to the music apparatus. The invention music apparatus comprises means for commanding the local terminal 2 to communicate with the host computer 1 through the network to download a set of the function module and the second interface module from the host computer 1, means for storing the set of the function module and the second interface module downloaded by the local terminal 2, and means for internally executing the stored function module through the stored second interface module to thereby extend the desired capability as the electronic musical instrument 3. Thus, the electronic musical instrument 3 can implement various new capabilities associated with the function of the electronic musical instrument by the function modules corresponding to the plurality of interface modules. Appropriately providing the host computer 1 with such a function allows easy upgrading of electronic musical instruments.

In the above described embodiments, the electronic musical instrument is used as the music apparatus. However, the music apparatus is not limited to the electronic musical instrument in the invention. For example, the music apparatus can be composed of a personal computer having function of an electronic musical instrument implemented by an application software. In such a case, a storage device such as a hard disk may store operation programs provided in the form of application software or else and related information used for realizing these local terminal and the music apparatus. The CPU loads these programs and information into RAM. Moreover, data and instructions stored in a removable and machine-readable record medium such as CD-ROM (Compact Disk Read Only Memory), floppy disk and magneto-optical disk may be transferred to a storage device such as the hard disk. Such a construction may facilitate installation of additional operation programs and related information and update thereof for version-up or else. Otherwise, program instructions may be directly transferred from the removable record medium to RAM.

Instead of the removable record medium, the operation programs and related information can be downloaded from a communication network to the hard disk through a communication interface. The following is an example in which the operation programs and related information is downloaded from the network. The communication interface is connected through a communication network such as LAN (Local Area Network). INTERNET AND telephone line to a server computer. The client local terminal sends a request command for the operation program and related information to the server computer through the communication interface and the communication network, if own storage device such as a hard disk does not have the operation program and related information. Upon receipt of the request command, the server computer distributes the requested program and related information to the local terminal through the communication network. The local terminal receives the distributed operation program and related information through the communication interface, and reserves the same in the storage device to thereby complete downloading.

The local terminal is implemented by a commercially available personal computer installed with the above mentioned operation program and related information. In such a case, data including the operation program and related information can be distributed by means of nonvolatile memory such as ROM, machine readable medium and communication interface.

As described and according to the invention, use of a network composed of a host computer and a local terminal allows extension of electronic musical instrument capabilities without restrictions of the local terminal. According to the methods of extending local terminal musical instrument capabilities associated with the invention, if an electronic musical instrument itself has no timbre synthesis capability, timbres can be set by using the timbre data that can be handled by this electronic musical instrument. In addition, if an electronic musical instrument itself has no automatic accompaniment capability, automatic accompaniment can be performed by using the play data that can be handled by this electronic musical instrument. Moreover, the specifications, capabilities, and handling of a particular electronic musical instrument can be examined by using emulation. Further, according to the present invention, new capabilities can be added to an electronic musical instrument and the same can be upgraded with ease.

What is claimed is:

1. A method of operating a music apparatus to function as an electronic musical instrument under control by a local terminal which is communicable with a host computer through a network, wherein the host computer includes a synthesizer capability utilized to compute timbre data, the method comprising the steps of:

connecting the local terminal to the host computer through the network to remotely control the synthesizer capability of the host computer so as to compute the timbre data prepared for the music apparatus;

downloading the computer timbre data from the host computer into the music apparatus through the local terminal so as to set a desired timbre of a musical tone; and operating the music apparatus to function as the electronic musical instrument to generate the musical tone having the desired timbre set by the downloaded timbre data.

2. A method of operating a music apparatus to function as an electronic musical instrument according to song data representative of a desired song under control by a local terminal which is communicable with a host computer through a network, wherein the host computer includes a sequencer capability utilized to time-sequentially process the song data to computer automatic play data, the method comprising the steps of:

connecting the local terminal to the host computer through the network to remotely control the sequencer capability of the host computer while supplying thereto the song data so as to compute the automatic play data prepared for the music apparatus;

downloading the computed automatic play data from the host computer into the music apparatus through the local terminal; and operating the music apparatus to function as the electronic musical instrument to undergo an automatic play of the desired song according to the downloaded automatic play data.

3. The method according to claim 2, wherein the step of operating further comprises manually operating the music apparatus to play the desired song along an accompaniment of the automatic play.

4. A method of operating a music apparatus to function as an electronic musical instrument under control by a local terminal which is communicable with a host computer through a network, wherein the host computer includes an emulator capability utilized to emulate an operation of the electronic musical instrument, the method comprising the steps of:

connecting the local terminal to the host computer through the network to remotely control the emulator capability of the host computer so as to compute operation data indicative of the operation of the electronic musical instrument upon emulation thereof;

downloading the computer operation data from the host computer into the music apparatus through the local terminal; and virtually operating the music apparatus to function as the electronic musical instrument to investigate performance thereof according to the downloaded operation data without actually operating the music apparatus.

5. A method of extending a desired capability of a music apparatus having a function of an electronic musical instrument under control by a local terminal which is communicable with a host computer through a network, wherein the host computer includes a program composed of a function module which is executable to provide the desired capability, a first interface module which interfaces the function module with the local terminal through the network when the local terminal remotely executes the function module installed in the host computer, and a second interface module which is specifically designed to adapt the function module to the music apparatus, the method comprising the steps of:

connecting the local terminal to the host computer through the network to download a set of the function module and the second interface module into the music apparatus by means of the local terminal; and allowing the music apparatus to internally execute the downloaded function module through the downloaded second interface module to thereby extend the desired capability as the electronic musical instrument.

6. A system for operating a music apparatus having a function as an electronic musical instrument under control by a local terminal which is communicable with a host computer through a network, wherein the system comprises:

the host computer installed with a capability utilized to compute data effective to extend the function of the electronic musical instrument;

the local terminal connectable to the host computer through the network to remotely control the capability of the host computer so as to compute the data prepared for the music apparatus, the local terminal downloading the computed data from the host computer into the music apparatus through the local terminal; and the music apparatus operative according to the downloaded data to extend its own function as the electronic musical instrument.

7. The system according to claim 6, wherein the host computer is installed with a synthesizer capability utilized to compute timbre data effective to set a desired timbre of a musical tone so that the music apparatus operates to function as the electronic musical instrument to generate the musical tone having the desired timbre set by the downloaded timbre data.

8. The system according to claim 6, wherein the host computer is installed with a sequencer capability utilized to compute automatic play data by time-sequentially processing song data which is provided from the local terminal and which indicates a desired song so that the music apparatus operates to function as the electronic musical instrument to undergo an automatic play of the desired song according to the downloaded automatic play data.

9. The system according to claim 6, wherein the host computer is installed with an emulator capability utilized to emulate an operation of the electronic musical instrument so as to compute operation data indicative of the operation of the electronic musical instrument upon emulation thereof so that the music apparatus is virtually operated to function as the electronic musical instrument to investigate performance thereof according to the downloaded operation data without actually operating the music apparatus.

10. A system for extending a desired capability of a music apparatus having a function of an electronic musical instrument under control by a local terminal which is communicable with a host computer through a network, wherein the system comprises:

the host computer installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus;

the local terminal connected to the host computer through the network to download a set of the function module and the second interface module from the host computer; and the music apparatus equipped in the local terminal and having a memory for storing the set of the function module and the second interface module downloaded by the local terminal, the music apparatus internally executing the stored function module through the stored second interface module to thereby extend the desired capability as the electronic musical instrument.

11. A local terminal communicable with a host computer through a network for operating a music apparatus which is equipped in the local terminal and which has a function as an electronic musical instrument, the host computer being installed with a capability utilized to compute data effective to extent the function of the electronic musical instrument, the local terminal comprising:

means for communicating with the host computer through the network to remotely control the capability of the host computer so as to compute the data prepared for the music apparatus;

means for downloading the computed data from the host computer into the music apparatus through the network; and means for allowing the music apparatus to operate according to the downloaded data to extend its own function as the electronic musical instrument.

12. A local terminal communicable with a host computer through a network for extending a desired capability of a music apparatus which is equipped in the local terminal and which has a function of an electronic musical instrument, the host computer being installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus, the local terminal comprising:

means for communicating with the host computer through the network to download a set of the function module and the second interface module from the host computer;

means for storing the set of the function module and the second interface module downloaded by the local terminal into a memory provided in the music apparatus; and means for allowing the music apparatus to internally execute the stored function module through the stored second interface module to thereby extend the desired capability as the electronic musical instrument.

13. A music apparatus attachable to a local terminal which is communicable with a host computer through a network for extending a desired capability of the music apparatus having a function of an electronic musical instrument, the host computer being installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus, the music apparatus comprising:

means for commanding the local terminal to communicate with the host computer through the network to download a set of the function module and the second interface module from the host computer;

means for storing the set of the function module and the second interface module downloaded by the local terminal; and means for internally executing the stored function module through the stored second interface module to thereby extend the desired capability as the electronic musical instrument.

14. A machine readable medium for use in a local terminal which has a CPU and which is communicable with a host computer through a network, the host computer being installed with a synthesizer capability utilized to compute timbre data, the medium containing program instructions executable by the CPU for causing the local terminal to operate a music apparatus equipped therein to function as an electronic musical instrument by the steps of:

connecting the local terminal to the host computer through the network to remotely control the synthesizer capability of the host computer so as to compute the timbre data prepared for the music apparatus;

downloading the computed timbre data from the host computer into the music apparatus through the local terminal so as to set a desired timbre of a musical tone; and operating the music apparatus to function as the electronic musical instrument to generate the musical tone having the desired timbre set by the downloaded timbre data.

15. A machine readable medium for use in a local terminal which has a CPU and which is communicable with a host computer through a network, the host computer being installed with a sequencer capability utilized to time-sequentially process song data representative of a desired song to compute automatic play data, the medium containing program instructions executable by the CPU for causing the local terminal to operate a music apparatus equipped therein to function as an electronic musical instrument by the steps of:

connecting the local terminal to the host computer through the network to remotely control the sequencer capability of the host computer while supplying thereto the song data so as to compute the automatic play data prepared for the music apparatus;

downloading the computed automatic play data from the host computer into the music apparatus through the local terminal; and operating the music apparatus to function as the electronic musical instrument to undergo an automatic play of the desired song according to the downloaded automatic play data.

16. A machine readable medium for use in a local terminal which has a CPU and which is communicable with a host computer through a network, the host computer being installed with an emulator capability utilized to emulate an operation of an electronic musical instrument, the medium containing program instructions executable by the CPU for causing the local terminal to operate a music apparatus equipped therein to function as the electronic musical instrument by the steps of: connecting the local terminal to the host computer through the network to remotely control the emulator capability of the host computer so as to compute operation data indicative of the operation of the electronic musical instrument upon emulation thereof;

downloading the computed operation data from the host computer into the music apparatus through the local terminal; and virtually operating the music apparatus to function as the electronic musical instrument to investigate performance thereof according to the downloaded operation data without actually operating the music apparatus.

17. A machine readable medium for use in a local terminal which has a CPU and which is communicable with a host computer through a network, the host computer being installed with a capability utilized to compute data effective to extend a function of an electronic musical instrument, the medium containing program instructions executable by the CPU for causing the local terminal to operate a music apparatus equipped therein to function as the electronic musical instrument by the steps of:

communicating with the host computer through the network to remotely control the capability of the host computer so as to compute the data prepared for the music apparatus;

downloading the computed data from the host computer into the music apparatus through the network; and allowing the music apparatus to operate according to the downloaded data to extend its own function as the electronic musical instrument.

18. A machine readable medium for use in a local terminal which has a CPU and which is communicable with a host computer through a network for extending a desired capability of a music apparatus which is equipped in the local terminal and which has a function of an electronic musical instrument, the host computer being installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus, the machine readable medium containing instructions processed by the CPU for causing the local terminal to operate the music apparatus by the steps of:

communicating with the host computer through the network to download a set of the function module and the second interface module from the host computer;

storing the set of the function module and the second interface module downloaded by the local terminal into a memory provided in the music apparatus; and allowing the music apparatus to internally execute the stored function module through the stored second interface module to thereby extend the desired capability as the electronic musical instrument.

19. A machine readable medium for use in a music apparatus which has a CPU and which is attachable to a local terminal communicable with a host computer through a network for extending a desired capability of the music apparatus having a function of an electronic musical instrument, the host computer being installed with a program composed of a function module which is executable to provide the desired capability and a first interface module which interfaces the function module with the local terminal through the network when the local terminal remotely executes the function module installed in the host computer, the host computer further being installed with a second interface module which is specifically prepared to adapt the function module to the music apparatus, the medium containing instructions processed by the CPU for causing the music apparatus to perform the steps of:

commanding the local terminal to communicate with the host computer through the network to download a set of the function module and the second interface module from the host computer;

storing the set of the function module and the second interface module downloaded by the local terminal; and internally executing the stored function module through the stored second interface module to thereby extend the desired capability as the electronic musical instrument.

*20. A method of operating a host apparatus having a capability of preparing data or function modules effective to extend a function of a music apparatus as an electronic musical instrument under control by a terminal apparatus which is communicable with the host apparatus through a network, the method comprising the steps of:*

*remotely controlling the capability of the host apparatus through the network by using the terminal apparatus so as to prepare the data or function modules for the music apparatus;*

*requesting the host apparatus to download the prepared data or function modules to the music apparatus through the terminal apparatus; and*

*installing the downloaded data or function modules into the music apparatus to extend the function of the music apparatus as the electronic musical instrument.*

*21. The method according to claim 20, wherein the remotely controlling step remotely controls the host apparatus having a synthesizer capability utilized to provide timbre data effective to set a desired timbre of a musical tone so that the music apparatus operates to function as the electronic musical instrument to generate the musical tone having the desired timbre set by the downloaded timbre data.*

*22. The method according to claim 20, wherein the remotely controlling step remotely controls the host apparatus having a sequencer capability utilized to provide automatic play data by time-sequentially processing song data which is provided from the terminal apparatus and which indicates a desired song so that the music apparatus operates to function as the electronic musical instrument to undergo an automatic play of the desired song according to the downloaded automatic play data.*

*23. The method according to claim 20, wherein the remotely controlling step remotely controls the host apparatus having an emulator capability utilized to emulate an operation of the electronic musical instrument so as to provide operation data indicative of the operation of the electronic musical instrument upon emulation thereof so that the music apparatus is virtually operated to function as the electronic musical instrument to investigate performance thereof according to the downloaded operation data without actually operating the music apparatus.*

*24. A method of operating a terminal apparatus for controlling a music apparatus having a function as an electronic musical instrument while communicating through a network with a host apparatus having a capability utilized to provide data or function modules effective to extend the*

*function of the electronic musical instrument, the method comprising the steps of:*

*connecting the terminal apparatus to the host apparatus through the network to remotely control the capability of the host apparatus so as to provide the data or function modules prepared for the music apparatus; and*

*downloading the provided data or function modules from the host apparatus into the music apparatus through the terminal apparatus, thereby enabling the music apparatus to extend its own function as the electronic musical instrument according to the downloaded data or function modules.*

*25. The method according to claim 24, wherein the step of downloading downloads the provided data in the form of timbre data for setting a desired timbre of a musical tone generated by the music apparatus.*

*26. The method according to claim 24, wherein the step of downloading downloads the provided data in the form of automatic play data for executing an automatic play of a desired song in the music apparatus, the automatic play data being computed prior to the step of downloading by time-sequentially processing song data representing the desired song.*

*27. The method according to claim 26, wherein the music apparatus can be manually operated to play the desired song along an accompaniment of the automatic play.*

*28. The method according to claim 24, wherein the step of downloading downloads the provided data in the form of operation data for virtually operating the music apparatus to function as the electronic musical instrument to investigate performance thereof according to the operation data without actually operating the music apparatus, the operation data being computed prior to the step of downloading by emulating the operation of an electronic musical instrument on the host apparatus.*

*29. A host apparatus having a desired capability to extend a function of a music apparatus as an electronic musical instrument under control by a terminal apparatus which is communicable with the host apparatus through a network, the host apparatus comprising:*

*an interface section connectable to the terminal apparatus through the network to enable the terminal apparatus to remotely control the capability of the host apparatus so as to provide data or function modules prepared for the music apparatus; and*

*a downloading section that downloads the provided data or function modules to the music apparatus through the terminal apparatus, thereby enabling the music apparatus to extend its own function as the electronic musical instrument according to the downloaded data or function modules.*

*30. A host apparatus to be attached to a system for extending a desired capability of a music apparatus having a function of an electronic musical instrument under control by a terminal apparatus which is communicable with the host apparatus through a network, the host apparatus comprising:*

*a program constituting a function module executable to provide the desired capability;*

*a first interface module which interfaces the function module with the terminal apparatus through the network when the terminal apparatus remotely executes the function module installed in the host apparatus;*

*a second interface module which is specifically designed to adapt the function module to the music apparatus; and*

*a device for communication with the terminal apparatus through the network to download a set of the function module and the second interface module into the music apparatus by means of the terminal apparatus, thereby allowing the music apparatus to internally execute the downloaded function module through the downloaded second interface module to thereby extend the desired capability as the electronic musical instrument.*

*31. A music apparatus performing a function as an electronic musical instrument under control by a terminal apparatus which is communicable through a network with a host apparatus having a capability utilized to provide data or function modules effective to extend the function of the music apparatus, the music apparatus comprising:*

*a section that requests the terminal apparatus for remotely controlling the capability of the host apparatus so as to provide the data or function modules prepared for the music apparatus;*

*a receiving section that receives the data or function modules provided from the host apparatus through the terminal apparatus: and*

*an operating section operative according to the received data or function modules to extend its own function as the electronic musical instrument.*

*32. A machine readable medium for use in a host apparatus which has a CPU with a capability of preparing data or function modules effective to extend a function of a music apparatus as an electronic musical instrument under control by a terminal apparatus which is communicable with the host apparatus through a network, the medium containing program instructions executable by the CPU for causing the host apparatus to perform a process by the steps of:*

*controlling the capability of the host apparatus through the network by using the terminal apparatus so as to prepare the data or function modules for the music apparatus;*

*operating the host apparatus to download the prepared data or function modules to the music apparatus through the terminal apparatus; and*

*installing the downloaded data or function modules into the music apparatus to extend the function of the music apparatus as the electronic musical instrument.*

*33. A machine readable medium for use in a host apparatus which has a CPU and which is communicable with a terminal apparatus through a network, the medium containing program instructions executable by the CPU for causing the host apparatus to extend a capability of a music apparatus having a function of an electronic musical instrument under control of the terminal apparatus, by the steps of:*

*installing the host apparatus with a program composed of a function module which is executable to provide the capability and a first interface module which interfaces the function module with the terminal apparatus through the network when the terminal apparatus remotely executes the function module installed in the host apparatus;*

*preparing in the host apparatus a second interface module which is specifically designed to adapt the function module to the music apparatus; and*

*connecting the host apparatus to the terminal apparatus through the network to download a set of the function*

*module and the second interface module into the music apparatus by means of the terminal apparatus, thereby allowing the music apparatus to internally execute the downloaded function module through the downloaded second interface module to thereby extend the capability of the music apparatus as the electronic musical instrument.*

*34. A machine readable medium for use in a music apparatus having a CPU and performing a function as an electronic musical instrument under control by a terminal apparatus which is communicable through a network with a host apparatus having a capability utilized to provide data or function modules effective to extend the function of the music apparatus, the medium containing program instructions executable by the CPU for causing the music apparatus to perform a process by the steps of:*

*requesting the terminal apparatus for remotely controlling the capability of the host apparatus so as to provide the data or function modules prepared for the music apparatus;*

*receiving the data or function modules provided from the host apparatus through the terminal apparatus; and*

*operating the music apparatus according to the received data or function modules to extend the function of the music apparatus as the electronic musical instrument.*

* * * * *